Patented June 6, 1939

2,160,861

UNITED STATES PATENT OFFICE 2,160,861

PROCESS OF TREATING MARINE OILS

William Hassard, Vancouver, British Columbia, Canada, assignor to David B. Boyd, Los Angeles, Calif.

No Drawing. Application October 23, 1937, Serial No. 170,643

9 Claims. (Cl. 260—406)

This invention relates to a process of treating marine oils such as, for example, sardine oil, pilchard oil, whale oil, etc., whereby said marine oils are rendered more suitable for use in paints or those uses which require improved drying characteristics as, for example, in the manufacture of linoleum and the like. The method is also applicable to the treatment of vegetable oils such as linseed, olive, etc.

Heretofore fish oil such as, for example, sardine oil, has been deemed unsatisfactory for use in paints because such oils are semi-drying only and do not form a non-tacky, hard film when subjected to oxidation or weathering. This is primarily due to the fact that these marine oils contain appreciable quantities of the higher fatty acids such as, for example, palmitic and stearic acids, the solid mixture of these acids being known in the trade as "stearin". Some attempt has been made in the past to improve these oils by winterizing them, that is, by chilling them to a very low temperature so as to solidify and precipitate stearin and then remove the same from the oil by filtration or otherwise. This process is expensive and not satisfactory.

Another requirement of a drying or paint oil is that it have a relatively high iodine number, the higher iodine number indicating a higher content of unsaturated substances which are capable of absorbing oxygen and forming a suitably hard, dry film when used as a paint. Practically all fish oils have an iodine number which is materially below the minimum iodine number acceptable by the paint trade as a drying oil.

The present invention is directed toward a process which may be readily carried out on various marine and animals oils for the purpose of improving their drying characteristics and rendering the oil much more suitable for those uses which require oils of the drying type. Generally stated, the invention comprises treating the oil with an aqueous solution of potassium permanganate and then separating the aqueous solution from the treated oil. The process is preferably carried out at relatively low temperatures and is not to be confused with a heat-bodying process. It appears probable that the stearin and higher fatty acids such as palmitic and stearic, are converted during the process into unsaturated compounds or compounds which are capable of absorbing oxygen very readily.

It is an object of this invention, therefore, to disclose and provide a method of increasing the drying power of marine and animal oils.

A further object is to provide a method of treating marine and animal oils whereby the treated oil is characterized by a higher iodine number and a lower stearin content.

A further object is to provide a method of purifying and stabilizing marine and animal oils by the use of permanganate solutions.

Numerous other objects, uses and advantages of this process will become apparent to those skilled in the art from the following detailed description. In order to facilitate understanding, reference will be specifically made hereinafter to fish oils such as, for example, pilchard oil, but it is to be understood that these specific oils are mentioned as examples and illustrations and the invention is not limited thereto but instead is capable of being employed on various stearin-containing oils.

As stated hereinbefore, the method includes the step of producing an intimate contact between the oil to be treated and an aqueous solution of potassium permanganate. Ordinarily, the permanganate solution is used in the proportion of between about 0.3 to 1.3 volumes of solution to 1 volume of oil, although prolonged agitation or contact of 1 volume of oil with 0.1 volume of solution will also produce the desired results. The aqueous solutions preferably contain from about 0.05% to 2.0% of potassium permanganate, best results being obtained on relatively fresh sardine or pilchard oil with from about 0.05% to 0.1 of potassium permanganate. When an old, partly rancid or dark oil is being treated, then the aqueous solutions may contain from 0.8% to as high as 2.0% of potassium permanganate. When these higher concentrations of permanganate are employed, a smaller volume of such solution can be used per volume of oil.

Contact between the oil and aqueous solution is preferably accomplished at atmospheric temperatures or temperatures below about 150° F. The oil to be treated is therefore not subjected to sufficiently high temperatures, for example, temperatures of 250° F. or more, which cause polymerization or heat-bodying of the constituents. Contact between the aqueous solution and the oil may be accomplished in any suitable form of apparatus. When the oil to be treated and the permanganate solution are mixed, they should be thoroughly agitated so as to produce intimate contact. Ordinarily a quick-breaking emulsion is formed by such mixture. The time of contact does not appear to be critical and the time during which the oil and aqueous solution are in contact will vary with the size of the batch, the type of equipment used, and whether the process is operated as a batch or as a continuous process.

After such intimate mixture has been attained the mixture or emulsion is separated by gravity as, for example, by settling or centrifuging. The use of centrifugal separators is desirable since these devices are capable of separating the emulsion and separately discharging treated oil, an aqueous phase and solid material.

It will be found that the oil treated as above described will have a higher iodine number than the original oil. Furthermore, its ability to absorb oxygen will be greater and the drying time of the oil will be shorter. No appreciable change in specific gravity, viscosity, acid number and saponification number would have taken place although the percentage of unsaponifiable matter may be slightly increased.

In one specific example of the process a pilchard oil was treated with an equal volume of an aqueous solution containing 0.07% of potassium permanganate at atmospheric temperatures and after thorough agitation the mixture was passed through an S. K. F. centrifugal separator. Portions of the treated and untreated oils were then tested and the following results were obtained:

| Mark | "Raw" No. 1 | "Treated" No. 2 |
| --- | --- | --- |
| Specific Gravity at 60° F | 0.930 | 0.930 |
| Iodine number (Wijs) | 168 | 180 |
| Stearin | 0.33% | 0.08% |
| Viscosity, Saybolt Universal at 100° F | 137 secs. | 135 secs. |
| Acid number | 0.09 | 0.09 |
| Saponification number | 192 | 191 |
| Unsaponifiable matter | 0.29% | 0.41% |
| Drying time | 50 hours | 42 hours |

| Oxygen absorption | Percent | Percent |
| --- | --- | --- |
| Percent increase in weight after— | | |
| 18 hours | 1.5 | 3.0 |
| 48 hours | 5.0 | 7.4 |
| 96 hours | 11.0 | 10.5 |

For purposes of comparison, a raw linseed oil having an iodine number of 177 was also treated to determine the amount of oxygen which it would absorb and it was found that such raw linseed oil increased only 1% at the end of 18 hours, 2% after 48 hours and 7.2% after 96 hours. These results very definitely show that this pilchard oil is more effective as a paint oil than even raw linseed oil. The oil treated in this example was fresh pilchard oil of high quality and much greater relative improvement is obtained by this process on lower grade oils.

In the above tabulation attention is specifically called to the fact that the viscosity of the treated oil was slightly lower than that of the raw oil and that the stearin content had been reduced from 0.33% to only 0.08%. The iodine number, however, had been increased from 168 to 180.

It is to be remembered that no mineral acids are added to the aqueous solution with which the oil is brought in contact. The color of the oil remains practically unchanged although minor changes in coloration are sometimes evidenced.

In certain instances the raw untreated oil may be subjected to a filtration or preliminary clarification for the purpose of removing solid particles of flesh and the like. Furthermore, it is sometimes desirable to add a small quantity of a material such as finely divided talc, diatomaceous earth, short asbestos, tailings or fines, etc., to the mixture or aqueous solution and oil during agitation. When such mineral constituents are used they may be added in amount ranging from about 0.1% to 1% by weight of the oil. During subsequent separation of the emulsion into oil and aqueous constituents, the finely divided insoluble mineral or other solid matter exerts a clarifying effect, thereby tending to produce a brilliant or polished oil. Activated carbons or the like may also be added for the purpose of partially bleaching the oil.

I claim:

1. A method of treating marine and animal oils to increase their iodine numbers and drying characteristics which comprises: producing intimate contact between the oil to be treated and an aqueous solution of potassium permanganate in the absence of mineral acid, and then separating the mixture to separately discharge treated oil and an aqueous solution.

2. A method of increasing the drying power of marine and animal oils which comprises: mixing a dilute aqueous solution of potassium permanganate with a marine or animal oil to be treated, in the proportion of between about 0.3 to 1.3 volumes of solution to 1 volume of oil, and then gravitationally separating the oil from the mixture.

3. A method of increasing the drying power of marine and animal oils which comprises: mixing a dilute aqueous solution of potassium permanganate with a marine or animal oil to be treated, in the proportion of between about 0.3 to 1.3 volumes of solution to 1 volume of oil, at a temperature below about 150° F., and in the absence of added mineral acid, and then gravitationally separating the oil from the mixture.

4. A method of increasing the iodine number and decreasing the stearin content of marine and animal oils which comprises: mixing a dilute aqueous solution of potassium permanganate with a marine or animal oil to be treated, in the proportion of between about 0.3 to 1.3 volumes of solution to 1 volume of oil, at a temperature below about 150° F., agitating the mixture in the virtual absence of added mineral acid, and then gravitationally separating the oil from the mixture.

5. A method of decreasing the stearin content of marine oils and increasing the drying power thereof, which comprises: producing intimate contact between a marine oil to be treated and a dilute aqueous solution of potassium permanganate, at temperatures insufficient to heat-body the oil and in the virtual absence of added mineral acid, and then gravitationally separating the oil from the mixture.

6. A method of decreasing the stearin content of marine oils and increasing the drying power thereof, which comprises: producing intimate contact between a marine oil to be treated and a dilute aqueous solution of potassium permanganate at temperatures insufficient to heat-body the oil and in the virtual absence of added mineral acid, adding a small proportion of finely divided solid material to said mixture, and then gravitationally separating the oil from the mixture.

7. A method of increasing the drying power of marine, animal and vegetable oils which comprises: producing intimate contact between the oil to be treated and an aqueous solution containing from about 0.05% to 2.0% of potassium permanganate at temperatures insufficient to heat-body the oil, and then gravitationally separating the oil from the mixture.

8. A method of increasing the drying power of marine, animal and vegetable oils which comprises: producing intimate contact between the oil to be treated and an aqueous solution containing from about 0.05% to 2.0% of potassium permanganate at temperatures insufficient to heat-body the oil, in the proportion of between about 0.1 to 1.3 volumes of solution to 1 volume of oil, and in the virtual absence of added mineral acid, and then gravitationally separating the oil from the mixture.

9. A method of increasing the drying power of marine, animal and vegetable oils which comprises: producing intimate contact between the oil to be treated and an aqueous solution containing from about 0.05% to 2.0% of potassium permanganate at temperatures insufficient to heat-body the oil, adding a small proportion of finally divided magnesia-containing material to said mixture, and then gravitationally separating the oil from the mixture.

WILLIAM HASSARD.